(12) United States Patent
Reeves et al.

(10) Patent No.: US 8,869,301 B2
(45) Date of Patent: *Oct. 21, 2014

(54) METHODS, DATA PROCESSING SYSTEMS, AND COMPUTER PROGRAM PRODUCTS FOR ASSIGNING PRIVACY LEVELS TO DATA ELEMENTS

(75) Inventors: Jonathan Reeves, Roswell, GA (US); Karl Cartwright, Dacula, GA (US); Ari Craine, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/536,436

(22) Filed: Jun. 28, 2012

(65) Prior Publication Data

US 2012/0272333 A1    Oct. 25, 2012

Related U.S. Application Data

(63) Continuation of application No. 11/593,233, filed on Nov. 6, 2006, now Pat. No. 8,239,916.

(51) Int. Cl.
*G06F 21/00* (2013.01)
*G06F 21/62* (2013.01)

(52) U.S. Cl.
CPC ........ *G06F 21/62* (2013.01); *G06F 2221/2113* (2013.01); *G06F 21/6245* (2013.01)
USPC .................................. 726/27; 726/1

(58) Field of Classification Search
None
See application file for complete search history.

(56) References Cited

U.S. PATENT DOCUMENTS

| | | | |
|---|---|---|---|
| 6,886,101 B2 | 4/2005 | Glazer et al. | |
| 7,526,650 B1 | 4/2009 | Wimmer | |
| 7,565,685 B2 * | 7/2009 | Ross et al. | 726/1 |
| 7,681,230 B2 | 3/2010 | O'Brien | |
| 7,958,351 B2 | 6/2011 | Luthi | |
| 2003/0140044 A1 | 7/2003 | Mok et al. | |
| 2004/0070678 A1 | 4/2004 | Toyama et al. | |
| 2004/0199782 A1 | 10/2004 | Arnold | |
| 2005/0204127 A1 | 9/2005 | Dive-Reclus et al. | |
| 2005/0251865 A1 | 11/2005 | Mont et al. | |
| 2006/0173985 A1 | 8/2006 | Moore | |
| 2007/0118876 A1 * | 5/2007 | Singh et al. | 726/2 |
| 2007/0157311 A1 * | 7/2007 | Meier et al. | 726/22 |

* cited by examiner

*Primary Examiner* — Jeffrey Pwu
*Assistant Examiner* — Helai Salehi
(74) *Attorney, Agent, or Firm* — Myers Bigel Sibley & Sajovec

(57) ABSTRACT

Methods, data processing systems and computer program products for assessing and assigning privacy levels to data elements are provided. A method of assigning privacy levels to data elements (e.g., text files, web page files, image files, audio files, video files, and portions thereof) includes assigning a predetermined privacy level to a data element; storing the data element with the assigned privacy level; determining if the assigned privacy level for data element is proper; and assigning a different privacy level to the data element in response to determining that a currently assigned privacy level for the data element is not proper. A predetermined privacy level may be assigned to a data element under various conditions, such as when the data element arrives at a device, when the data element is created by a device, and/or when the data element is modified by a device.

10 Claims, 2 Drawing Sheets

METHODS, DATA PROCESSING SYSTEMS, AND COMPUTER PROGRAM PRODUCTS FOR ASSIGNING PRIVACY LEVELS TO DATA ELEMENTS

CROSS-REFERENCE TO RELATED PATENT APPLICATION

This application is a continuation application of U.S. patent application Ser. No. 11/593,233, filed Nov. 6, 2006, now U.S. Pat. No. 8,239,916 the disclosure of which is incorporated herein by reference as if set forth in its entirety.

FIELD OF THE INVENTION

The present invention relates generally to information and, more particularly, to methods, data processing systems, and computer program products for handling information.

BACKGROUND OF THE INVENTION

The amount of personal information generated and transmitted on-line has proliferated over recent years. For example, sensitive or "private" information, such as medical and financial records increasingly are being created, modified and transmitted over networks, such as the Internet. In addition, individuals increasingly are sharing information and files (e.g., home movies, photograph albums, audio recordings, etc.) with others via the Internet.

Unfortunately, the sheer amount of information and the increasing numbers of information sources are posing increasingly difficult challenges to users with respect to protecting information privacy. As such, there is a need for better control and dissemination of private information.

SUMMARY OF THE INVENTION

According to some embodiments of the present invention, methods, data processing systems and computer program products are provided that facilitate assessing and assigning privacy levels to information. According to some embodiments of the present invention, a method of assigning privacy levels to data elements (e.g., text files, web page files, image files, audio files, video files, and portions thereof) includes assigning a predetermined privacy level to a data element; storing the data element with the assigned privacy level; determining if the assigned privacy level for data element is proper; and assigning a different privacy level to the data element in response to determining that a currently assigned privacy level for the data element is not proper. A predetermined privacy level may be assigned to a data element under various conditions, such as when the data element arrives at a device, when the data element is created by a device, and/or when the data element is modified by a device. For example, a predetermined privacy level is assigned to an image created by a user via a device (e.g., a personal computer, wireless communications device, etc.). A predetermined privacy level is assigned to the image when a user modifies the image. A predetermined privacy level is assigned to an image received from a third party, etc.

According to some embodiments of the present invention, the predetermined privacy level may be selected from a plurality of privacy levels, wherein each privacy level corresponds to a respective different degree of privacy. For example, three privacy levels (private, semi-private and public) may exist. Initially, a privacy level of "private" may be automatically assigned to each data element as a default (although any privacy level may be the default). This privacy level may be changed, subsequently, by a user or by a reassessment of what the proper privacy level should be for a particular data element.

According to some embodiments of the present invention, metadata is attached to data elements when stored. For example, information about a data element including, but not limited to, time and date, modification information, origination information, etc., is stored with the data element.

According to some embodiments of the present invention, determining if the assigned privacy level for a data element is proper includes analyzing the data element and determining what degree of privacy the data element should have.

According to some embodiments of the present invention, a data processing system hosted by a device in communication with a communications network (e.g., a personal computer, wireless communications device, etc.) assesses and assigns privacy levels to data elements. The data processing system is configured to assign a predetermined privacy level to a data element; to store the data element; to determine if the assigned privacy level for data element is proper; and to assign a different privacy level to the data element in response to determining that a currently assigned privacy level for the data element is not proper. According to some embodiments of the present invention, the data processing system is configured to assign a predetermined privacy level to a data element that arrives at the data processing system, that is created via the data processing system, and/or that is modified by the data processing system.

According to some embodiments of the present invention, the data processing system is configured to select a predetermined privacy level from a plurality of privacy levels, wherein each privacy level corresponds to a respective different degree of privacy. The data processing system may be configured to allow a user to subsequently change a privacy level and/or to change a privacy level by reassessing what the proper privacy level should be for a particular data element.

According to some embodiments of the present invention, the data processing system is configured to attach metadata to data elements when stored.

Other data processing systems, methods, and/or computer program products according to embodiments of the invention will be or become apparent to one with skill in the art upon review of the following drawings and detailed description. It is intended that all such additional data processing systems, methods, and/or computer program products be included within this description, be within the scope of the present invention, and be protected by the accompanying claims.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF EMBODIMENTS OF THE INVENTION

Figure 1:
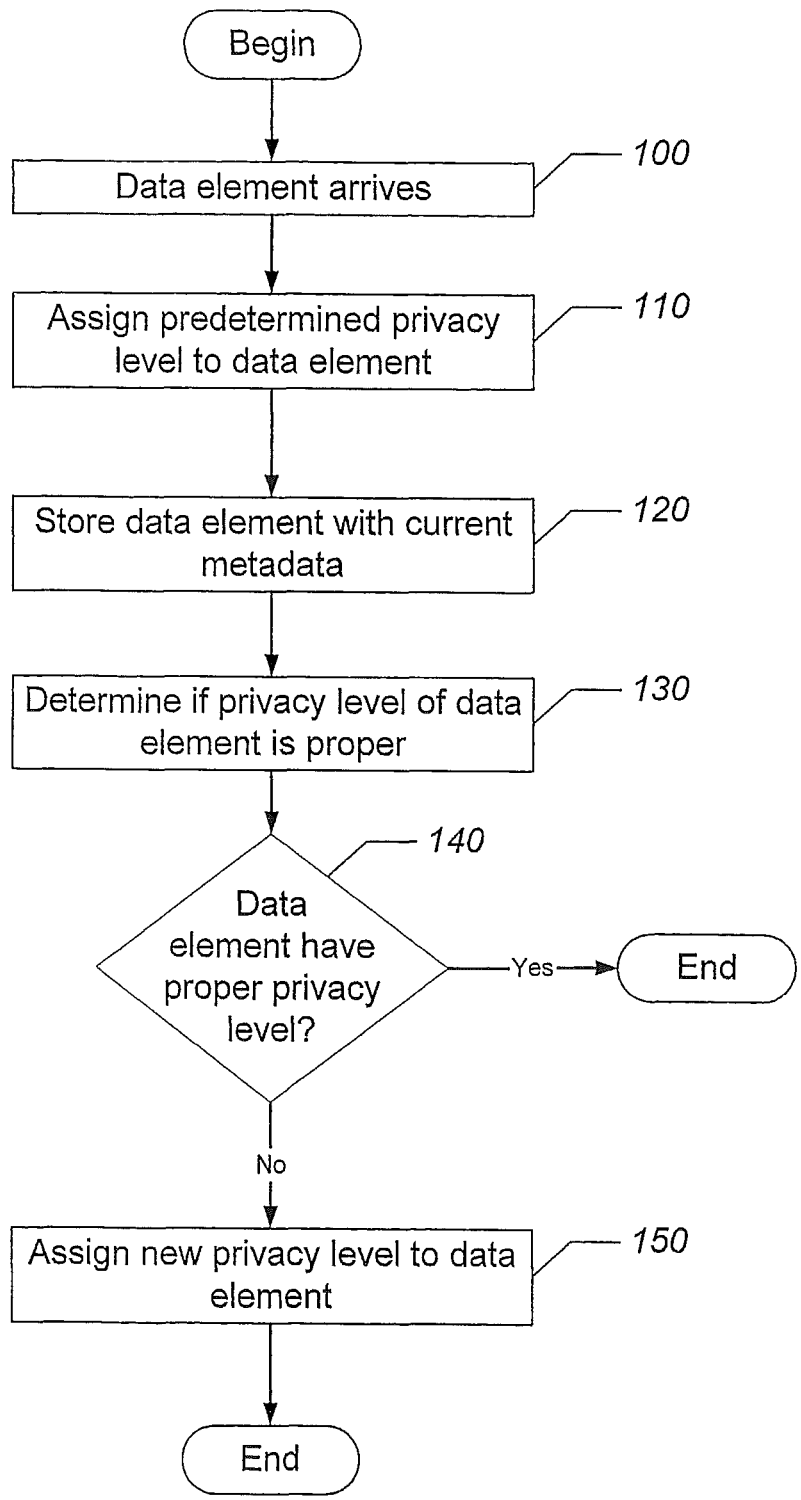
FIG. 1 is a flow chart that illustrates exemplary operations for assigning and assessing privacy levels of data elements, according to some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as data processing systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, the term "data element" means any type of information that a user may receive, create, and/or modify of any type including, but not limited to, text files, web page files, image files, audio files, video files, and portions thereof, etc. For example, a data element may include personal information about a person including, but not limited to, medical information, legal information, financial information, job information, geographic location information, etc. A data element may include information received from another source via, for example, a communications network.

Computer program code for carrying out operations of data processing systems discussed herein may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. Embodiments of the present invention are not limited to a particular programming language. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, data processing systems, and computer program products in accordance with exemplary embodiments of the invention. These flowchart and/or block diagrams further illustrate exemplary operations for assigning and assessing privacy levels of data elements, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Exemplary operations for assigning and assessing privacy levels of data elements, according to some embodiments of the present invention, will now be described with reference to FIG. 1. Initially, a data element "arrives" (Block 100). This means, for example, that a data element has been received from a third party via, for example a communications network, has been created by a user, has been modified by a user, has been detected by a device associated with the user (e.g., a medical device connected to a person that detects symptoms of a disease condition, etc.). A predetermined privacy level is assigned to the data element automatically (Block 110). The predetermined privacy level is a default privacy level that is automatically assigned to all data elements. According to some embodiments of the present invention, the predetermined privacy level may be selected from a plurality of privacy levels, wherein each privacy level corresponds to a respective different degree of privacy. For example, three privacy levels (private, semi-private and public) may exist. Initially, a privacy level of "private" may be automatically assigned to each data element as a default (although any privacy level may be the default). This privacy level may be changed, subsequently, by a user or by a reassessment of what the proper privacy level should be for a particular data element.

The types of data elements that may be assigned a privacy level of "private", according to some embodiments of the present invention, may include personal information such as medical information (e.g., sex, weight, height, medications, diseases, medical conditions, etc.), financial information (e.g., banking records and account information, assets, debts, credit reports, etc.), legal information (e.g., citizenship, arrest records, governmental information, etc.), location information (e.g., where a person is located, where a person travels, etc.), and psychological information (e.g., a person's present state of mind, mood, etc.). The types of data elements that may be assigned a privacy level of "semi-private", according to some embodiments of the present invention, may include information about a person's family and friends, information about where a person shops, information about what doctor a person uses, what dentist a person uses, what hairstylist a person uses, etc. The types of data elements that may be assigned a privacy level of "public", according to some embodiments of the present invention, may include information about a person that is observable to others, and other information that is readily available to the public or openly sharable (e.g., a person's hair color, a person's telephone number from the phone book, etc.). Data elements may be assigned different privacy levels at the same time and that depend upon the particular situation at any given moment. For example, a data element may be private (i.e., not accessible) to certain parties and public (i.e., accessible) to other parties.

A data element that has been assigned a predetermined privacy level is then stored (Block 120). Metadata that is associated with the data element (and that arrived with the data element) is stored, as well. As is known to those of skill in the art, metadata is a definition or description of data including such items as time and date of creation/modification, type of data, author of data, etc. In addition, new or most recent metadata may be attached to data elements when stored. For example, information about a data element including, but not limited to, time and date of receipt and/or modification, origination information, etc., may be stored with the data element.

A determination is then made whether the assigned privacy level of a data element is proper (Block 130). This determination may be an ongoing process for some or all data elements stored, and at predetermined time intervals, in order to accurately designate privacy levels for data elements. If it is determined that a data element has the proper privacy level assigned thereto (Block 140), operations for that data element terminate (at least for a predetermined period of time). If it is determined that a data element does not have the proper privacy level assigned thereto (Block 140), a new privacy level is assigned to the data element (Block 150).

Determining whether an assigned privacy level of a data element is proper (Block 130) includes analyzing the data element and determining what degree of privacy the data element should have. Such analysis may include, but is not limited to, determining what type of data the data element is (e.g., determining whether the data element is personal medical information, personal legal information, personal financial information, determining whether the data element is generally public information, etc.). Such analysis may also include determining how a user wishes to treat such data (e.g., as private or public information, etc.).

Such analysis may include use of a spider or search engine to learn more about data elements. For example, if a term is used in a data element, a spider may search the Internet or other network for a definition of the term. Comparisons may also be performed with existing data. For example, a particular type of data element may have previously been assigned a particular privacy level. As such, a similar data element should be assigned this privacy level, as well. According to some embodiments of the present invention, data is submitted to/stored in a rules-based repository which provides evaluations and customizable rankings. This is analogous to basic search engine logic (e.g., the privacy check is performed at runtime (when a set of results is queried) and at index time (as the spider crawls the data source). The front-end parameters are added to the automated query at execution time to serve-up only what a user is entitled to know/access.

Figure 2:
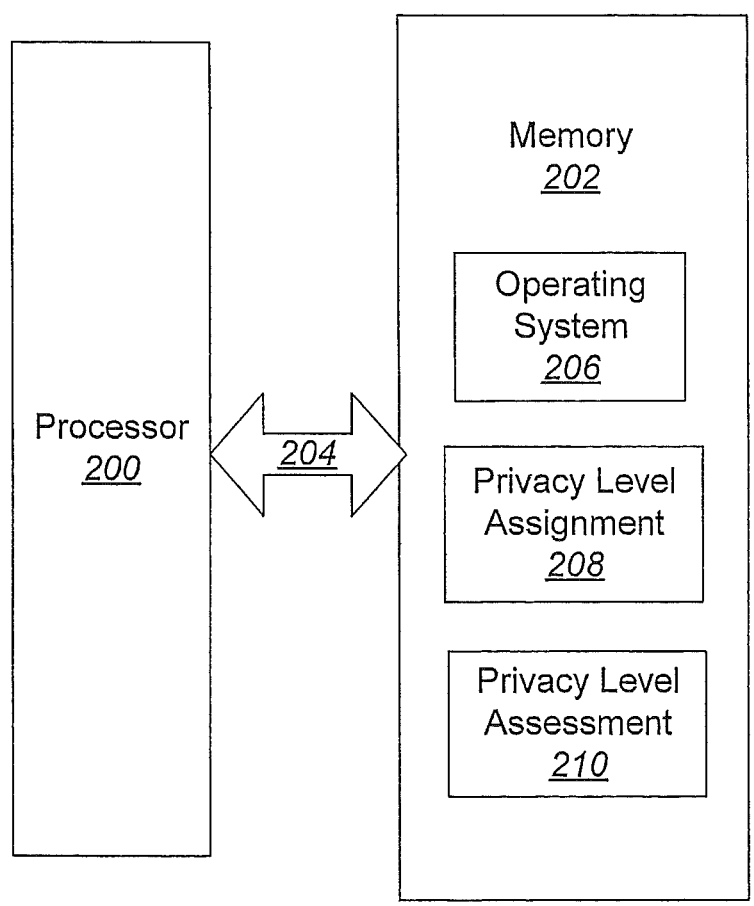
FIG. 2 is a block diagram that illustrates a processor and a memory hosted by a device that may be used in embodiments of a data processing system for assigning and assessing privacy levels of data elements, according to some embodiments of the present invention.

FIG. 2 illustrates a processor 200 and a memory 202 hosted by a device that may be used in embodiments of methods, data processing systems, and computer program products for assessing and assigning privacy levels to data elements, according to some embodiments of the present invention. The processor 200 communicates with the memory 202 via an address/data bus 204. The processor 200 may be, for example, a commercially available or custom microprocessor. The memory 202 is representative of the overall hierarchy of memory devices containing the software and data used to assess and assign privacy levels to data elements as described herein, in accordance with some embodiments of the present invention. The memory 202 may include, but is not limited to, the following types of devices: cache, ROM, PROM, EPROM, EEPROM, flash, SRAM, and DRAM.

As shown in FIG. 2, the memory 202 may hold various categories of software and data: an operating system 206, privacy level assignment application 208, and privacy level assessment application 210. The operating system 206 controls operations of a user device that receives, creates, modifies, transmits data elements, in accordance with embodiments of the present invention. In particular, the operating system 206 may manage a device's resources and may coordinate execution of various programs (e.g., the privacy level assignment application, privacy level assessment application, etc.) by the processor 200.

The privacy level assignment application 208 comprises logic for assigning a privacy level to a data element automatically, as described above. The privacy level assessment application 210 comprises logic for determining if the assigned privacy level of a data element is proper, as described above.

FIGS. 1-2 illustrate the architecture, functionality, and operations of some embodiments of methods, data processing systems, and computer program products for assessing and assigning privacy levels to data elements. In this regard, each block represents a module, segment, or portion of code, which comprises one or more executable instructions for implementing the specified logical function(s). It should also be noted that in other implementations, the function(s) noted in the blocks may occur out of the order noted in FIG. 1. For example, two blocks shown in succession may, in fact, be executed substantially concurrently or the blocks may sometimes be executed in the reverse order, depending on the functionality involved.

Example 1

A person with diabetes has a mobile personal medical device that includes one or more embedded bio sensor circuits (sensors) that are configured to measure and transmit health and other data to third parties. For example, the sensors may be configured to measure blood glucose level, temperature, pH, blood pressure, blood oxygen content, respiration, voice analysis, impact force, etc. The person becomes unconscious and the imbedded sensors show rapidly diminished respirations, reduced blood pressure and rapid pulse. These sensors could be configured to disclose the existence of the person's preexisting diabetes only to authorized personnel and/or devices, such as persons/devices authorized for EMS purposes.

Example 2

The person of Example 1 goes to see a new doctor for treatment of the person's diabetes. The person authorizes the doctor to access the person's medical information (i.e., sets the privacy level of data to "voluntary MD access"). This is similar to signing a HIPAA agreement at the doctor's office.

Example 3

The person of Example 1 goes to new job interview and does not want to be denied employment due to preexisting diabetes illness. The person sets the privacy level of data related to the person's diabetes to "public access denied." If the person has a firm offer in hand and requires a physical, the person can elect to change the privacy level to "disclose."

Example 4

As in Example 1, but the person's neighbor, who is a doctor, observes the person unconscious and renders medical aid before EMS arrives. The person is grateful for the help but does not want the neighbor to know about the person's overall medical condition. As such, the person can set the privacy level of medical data to be demoted when EMS services have concluded such that access is denied to others, including medical personnel.

Many variations and modifications can be made to the preferred embodiments without substantially departing from the principles of the present invention. All such variations and modifications are intended to be included herein within the scope of the present invention, as set forth in the following claims.

That which is claimed:

1. A method of assigning privacy levels to data elements, comprising:
    automatically assigning, via a device of a user, a predetermined privacy level to a data element when at least one of the following occurs: the data element arrives at the user device, the data element is created by the user device, and the data element is modified by the user device, and wherein the predetermined privacy level is selected by the user device from the group consisting of private, semi-private, and public privacy levels, each of the privacy levels corresponding to a respective different degree of privacy, wherein data elements assigned the privacy level of private include user medical information, user financial information, user legal information, user location information, and user psychological information, wherein data elements assigned the privacy level of semi-private include information about the user's family and friends, information about where the user shops, and information about service providers the user uses, and wherein data elements assigned the privacy level of public include information about the user that is observable to others and information that is readily available to the public or openly sharable;
    storing the data element with the assigned privacy level comprising attaching metadata to the data element;
    at predetermined time intervals, automatically determining, via the user device, if the assigned privacy level for the data element is proper, comprising analyzing the data element via the user device to determine what type of data the data element is, determining what degree of privacy the data element should have, and determining what privacy level a user wishes to treat the data element;
    automatically assigning, via the user device, a different one of the privacy levels to the data element in response to determining that a currently assigned privacy level for the data element is not proper.

2. The method of claim 1, wherein the data element is selected from group consisting of text files, web page files, image files, audio files, video files, and portions thereof.

3. The method of claim 1, wherein analyzing the data element via the user device to determine what type of data the data element is comprises searching a network for a definition of a term used in the data element.

4. The method of claim 1, further comprising allowing a user to change a privacy level assigned to a data element.

5. A data processing system that assigns privacy levels to data elements, comprising a user device to:
    automatically assign a predetermined privacy level to a data element when at least one of the following occurs: the data element arrives at the user device, the data element is created by the user device, and the data element is modified by the user device, and wherein the predetermined privacy level is selected from the group consisting of private, semi-private, and public privacy levels, each of the privacy levels corresponding to a respective different degree of privacy, wherein data elements assigned the privacy level of private include user medical information, user financial information, user legal information, user location information and user psychological information, wherein data elements assigned the privacy level of semi-private include information about the user's family and friends, information about where the user shops, and information about service providers the user uses, and wherein data elements assigned the privacy level of public include information about the user that is observable to others and information that is readily available to the public or openly sharable;
    store the data element comprising attaching metadata to the data element;
    at predetermined time intervals, automatically determine if the assigned privacy level for the data element is proper, comprising analyzing the data element to determine what type of data the data element is, determining what degree of privacy the data element should have, and determining what privacy level a user wishes to treat the data element;

and
automatically assign a different one of the privacy levels to the data element in response to determining that a currently assigned privacy level for the data element is not proper.

6. The data processing system of claim 5, wherein the data element is selected from group consisting of text files, web page files, image files, audio files, video files, and portions thereof.

7. The data processing system of claim 5, wherein analyzing the data element to determine what type of data the data element is comprises searching a network for a definition of a term used in the data element.

8. The data processing system of claim 5, further comprising means for allowing a user to change a privacy level assigned to a data element.

9. The data processing system of claim 5, wherein the data processing system is hosted by a device in communication with a communications network.

10. A computer program product for assigning privacy levels to data elements, comprising:
a non-transitory computer readable storage medium tangibly embodying a program executable with computer instructions, wherein the computer instructions comprise means for enabling a processor to:
automatically assign a predetermined privacy level to a data element when at least one of the following occurs: the data element arrives at a user device, the data element is created by the user device, and the data element is modified by the user device, and wherein the predetermined privacy level is selected from the group consisting of private, semi-private, and public privacy levels, each of the privacy levels corresponding to a respective different degree of privacy, wherein data elements assigned the privacy level of private include user medical information, user financial information, user legal information, user location information, and user psychological information, wherein data elements assigned the privacy level of semi-private include information about the user's family and friends, information about where the user shops, and information about service providers the user uses, and wherein data elements assigned the privacy level of public include information about the user that is observable to others and information that is readily available to the public or openly sharable;
store the data element comprising attaching metadata to the data element;
at predetermined time intervals, automatically determine if the assigned privacy level for the data element is proper, comprising analyzing the data element to determine what type of data the data element is, determining what degree of privacy the data element should have, and determining what privacy level a user wishes to treat the data element;
and
automatically assign a different one of the privacy levels to the data element in response to determining that a currently assigned privacy level for the data element is not proper.

* * * * *